(12) United States Patent
Chen

(10) Patent No.: US 11,379,703 B1
(45) Date of Patent: Jul. 5, 2022

(54) PORTABLE IDENTIFICATION DEVICE, IDENTIFICATION SYSTEM USING ELECTRONIC PAPER AND OPERATION METHOD THEREOF

(71) Applicant: YourSaaS Co., Ltd., New Taipei (TW)

(72) Inventor: Wen Chin Chen, New Taipei (TW)

(73) Assignee: YourSaaS Co., Ltd., New Taipei (TW)

( * ) Notice: Subject to any disclaimer, the term of this patent is extended or adjusted under 35 U.S.C. 154(b) by 0 days.

(21) Appl. No.: 17/316,641

(22) Filed: May 10, 2021

(30) Foreign Application Priority Data

Dec. 31, 2020 (TW) .................................. 109147040

(51) Int. Cl.
*G06K 19/077* (2006.01)
*G06K 19/07* (2006.01)

(52) U.S. Cl.
CPC ... *G06K 19/07707* (2013.01); *G06K 19/0723* (2013.01); *G06K 19/07705* (2013.01)

(58) Field of Classification Search
CPC ......... G06K 19/07707; G06K 19/0723; G06K 19/07705

(Continued)

(56) References Cited

U.S. PATENT DOCUMENTS 8,830,160 B2    9/2014   Gila et al.
9,990,784 B2    6/2018   McMahan et al.

(Continued)

FOREIGN PATENT DOCUMENTS

CN    100370390 C    2/2008
CN    102376206 A    3/2012

(Continued)

OTHER PUBLICATIONS

Second Taiwan Office Action with Search Report, dated Mar. 28, 2022 for corresponding Taiwan Application No. 109147040 with English summary translation (5 pages).

(Continued)

*Primary Examiner* — Michael G Lee
*Assistant Examiner* — David Tardif
(74) *Attorney, Agent, or Firm* — Intellectual Property Law Group LLP

(57) ABSTRACT

An identification system using electronic paper includes an external operation device and a portable identification device, the external operation device includes an external communication module for providing external display information; the portable identification device includes a wireless communication module, an electronic paper module, a timer module and a housing. The wireless communication module is configured to receive the external display information, and the electronic paper module includes a processing unit and a display unit. The processing unit is configured to drive the display unit according to the external display information so that the display unit displays an image including identification information and subsidiary information. The wireless communication module, the electronic paper module and the timer module are disposed in the housing so that the image is seen from the housing. The portable identification device, the identification system using electronic paper and the operation method thereof according to the instant disclosure increases the security and convenience of identification processes.

15 Claims, 7 Drawing Sheets

(58) Field of Classification Search
USPC .......................................................... 235/492
See application file for complete search history.

(56) References Cited

U.S. PATENT DOCUMENTS

| | | |
|---|---|---|
| 10,068,514 B2 | 9/2018 | Lin et al. |
| 2006/0205482 A1* | 9/2006 | Crivelli .................. G07F 17/32 463/25 |
| 2009/0276347 A1* | 11/2009 | Kargman ............. G06Q 20/385 705/35 |
| 2016/0093246 A1 | 3/2016 | Park |
| 2016/0335580 A1 | 11/2016 | Jones et al. |
| 2021/0154391 A1* | 5/2021 | Tennican ......... G06K 19/06028 |
| 2021/0192305 A1* | 6/2021 | Saenz .................... G06Q 50/28 |

FOREIGN PATENT DOCUMENTS

| | | |
|---|---|---|
| CN | 102857271 A | 1/2013 |
| CN | 106973166 A | 7/2017 |
| TW | 201531834 A | 8/2015 |
| TW | I574095 B | 3/2017 |
| TW | M594746 | 5/2020 |
| TW | M610088 | 4/2021 |

OTHER PUBLICATIONS

Taiwan Office Action, dated Nov. 26, 2021 for corresponding Taiwan Application No. 109147040 with English summary (9 pages).

\* cited by examiner

PORTABLE IDENTIFICATION DEVICE, IDENTIFICATION SYSTEM USING ELECTRONIC PAPER AND OPERATION METHOD THEREOF

CROSS-REFERENCE TO RELATED PATENT APPLICATION

This application claims the benefit under 35 U.S.C. §119 of Taiwan Patent Application Ser. No. 109147040 filed on Dec. 31, 2020, which is incorporated herein by reference in its entirety.

Some references, which may include patents, patent applications, known arts, and various publications, may be cited and discussed in the description of this disclosure. The citation and/or discussion of such references is provided merely to clarify the description of the present disclosure and this provision should not be construed to mean that any such references are "prior arts" to the disclosure described herein. All references cited and discussed in this specification are incorporated herein by reference in their entirety and to the same extent as if each reference was individually incorporated by reference.

FIELD OF THE DISCLOSURE

The present disclosure relates to a portable identification device, an identification system and the operation method thereof, and more particularly to a portable identification device, an identification system using electronic paper and the operation method thereof.

BACKGROUND

In the existing art, identification devices and admission passes, such as public transportation tickets for buses, trains and planes, in both paper form, such as printed tickets, and electronic form, such as virtual tickets on mobile devices, are commonly used as information carriers for identification or verification processes. However, regarding traditional information carriers made of paper, for example, transportation tickets, such as train or bus tickets, airplane tickets and ferry tickets or passes for theaters, cinemas, concerts, amusement parks and so on, the content recited thereon cannot be altered or modified in order to maintain its validity, and these tickets generally cannot be reused, and thus they are not environmentally-friendly. Meanwhile, the electronic carriers for electronic tickets, such as mobile devices, generally require a specifically-designed application (app) downloaded and installed therein beforehand for the purposes of identification and verification. Further, there might be compatibility issues between the electronic tickets or app and the mobile device to be used as electronic carriers. Additionally, upon using mobile devices as carriers, if the power of the mobile device is low, or there is no Internet access or the access is poor, or the operation system, software or app of the mobile device fails, the information stored in the tickets may not be downloaded or updated successfully, and hence, the ticket may be rendered useless.

In addition, when a paper ticket or an electronic ticket is used as an admission pass for entering a venue where identity verification is required, the reliability of the identification process must be addressed and ensured. Specifically, in order to prevent reserved seats for the registered participants of an event from being occupied by unregistered persons, or to prevent the identity of the registered participants from being misrepresented by unregistered persons and thereby compromising the security of the event, an identification device, system and process that provide a higher level of security are needed.

SUMMARY

In response to the above-mentioned technical inadequacies, the present disclosure provides a portable identification device, an identification system using electronic paper and an operation method thereof. The present disclosure employs electronic paper, wherein a displayed image will be held even without electricity, as an element of the portable identification device and the identification system, wherein, with the aid of the identification mechanisms with different security levels, the convenience and security of the identification process is improved.

In one aspect, the present disclosure provides an identification system using electronic paper including an external operation device and a portable identification device. The external operation device includes an external communication module for providing at least external display information. The portable identification device includes a wireless communication module, an electronic paper module, a timer module and a housing. The electronic paper module is electrically coupled to the wireless communication module and includes a processing unit and a display unit electrically coupled to the processing unit. The processing unit is configured to receive the external display information from the wireless communication module and drive the display unit according to the external display information to allow the display unit to display an image corresponding to the external display information. The image includes at least identification information and subsidiary information. The timer module includes a clock timer electrically coupled to the processing unit, and the clock timer is configured to allow the processing unit to drive the display unit at a predetermined time for displaying the image on the display unit. The wireless communication module, the electronic paper module and the timer module are disposed in the housing in a manner such that the image displayed on the display unit is visible from the housing.

In a preferred embodiment, the wireless communication module includes at least one of a passive radio frequency identification (RFID) unit, a near-field communication (NFC) unit and a Bluetooth unit.

In a preferred embodiment, when the wireless communication module includes the passive RFID unit, the external communication module includes an RFID reader and the external operation device is connected to a database, wherein the RFID reader is configured to provide the external display information stored in the database to the wireless communication module, and to receive the identification information from the portable identification device.

In a preferred embodiment, when the wireless communication module includes the NFC unit or the Bluetooth unit, the external operation device is a mobile device with NFC or Bluetooth communication functionality, respectively.

In a preferred embodiment, the external display information comprises update information, and the mobile device is configured to transmit the update information to the portable identification device by the NFC or Bluetooth communication functionality, thereby altering at least one of the identification information and the subsidiary information.

In a preferred embodiment, the identification information comprises at least a picture and/or an identification message presented as an encrypted barcode.

In a preferred embodiment, the external operation device further includes a detecting module and an external processing module, wherein the detecting module is configured to detect the usage status of the portable identification device according to the image, and the external processing module is configured to generate the external display information according to the usage status.

In a preferred embodiment, the external operation device further includes an external processing module connected to a database, wherein the external processing module is configured to compare the identification information with file information stored in the database for generating the external display information.

In a preferred embodiment, the electronic paper module further includes a storage unit for storing the received external display information.

In a preferred embodiment, the electronic paper module further includes a storage unit for storing the external display information in advance, and the clock timer of the timer module is configured to prompt the processing unit to drive the display unit according to the external display information stored in the storage unit at a predetermined time for displaying the image on the display unit.

Another aspect of the present disclosure provides a method for operating an identification system using electronic paper, including: providing a portable identification device including an electronic paper module and a wireless communication module electrically coupled to the electronic paper module, wherein the electronic paper module includes a processing unit and a display unit electrically connected to the processing unit; transmitting at least external display information to the wireless communication module through an external communication module of an external operation device; receiving the external display information through the wireless communication module and transmitting the external display information to the processing unit of the electronic paper module; and driving the display unit through the processing unit to enable the display unit to display an image corresponding to the external display information according to the external display information, wherein the image includes at least identification information and subsidiary information.

In a preferred embodiment, the wireless communication module includes at least one of a passive RFID unit, an NFC unit and a Bluetooth unit.

In a preferred embodiment, the wireless communication module includes the passive RFID unit, the external communication module includes an RFID reader, and the method further includes: transmitting update information through the RFID reader to the passive RFID unit; receiving the update information through the passive RFID unit and transmitting the update information to the processing unit of the electronic paper module; and driving the display unit through the processing unit to update at least one of the identification information and the subsidiary information in the image according to the update information.

In a preferred embodiment, the method further includes: before the step of transmitting update information through the RFID reader to the passive RFID unit, receiving the identification information from the passive RFID unit of the portable identification device through the RFID reader.

In a preferred embodiment, the external operation device further includes an external processing module, and the update information is generated by the external processing module according to the received identification information.

Another aspect of the present disclosure provides a portable identification device including a wireless communication module, an electronic paper module, a timer module and a housing. The wireless communication module is electrically coupled to an external communication module included in an external operation device, and the external communication module is configured to provide at least external display information. The wireless communication module is configured to receive the external display information from the external communication module. The electronic paper module is electrically coupled to the wireless communication module and includes a processing unit and a display unit electrically coupled to the processing unit. The processing unit is configured to receive the external display information from the wireless communication module and drive the display unit according to the external display information to allow the display unit to display an image corresponding to the external display information. The image includes at least identification information and subsidiary information. The timer module includes a clock timer electrically coupled to the processing unit and is configured to allow the processing unit to drive the display unit at a predetermined time to display the image on the display unit. The wireless communication module, the electronic paper module and the timer module are disposed in the housing in a manner such that the image displayed on the display unit is visible from the housing.

One of the major technical features of the present disclosure is that, based on the unique design of the wireless communication module, the electronic paper module and the timer module in the portable identification device and the cooperation among the above modules and the external operation device, the portable identification device, the identification system using electronic paper and the operation method thereof provided herein may be used to display specific information on the display unit of the electronic paper module, and utilize such information to achieve the purpose of conveniently and efficiently performing personnel identification with high security.

BRIEF DESCRIPTION OF THE DRAWINGS

The present disclosure will become more fully understood from the following detailed description and accompanying drawings.

DETAILED DESCRIPTION

Figure 1:
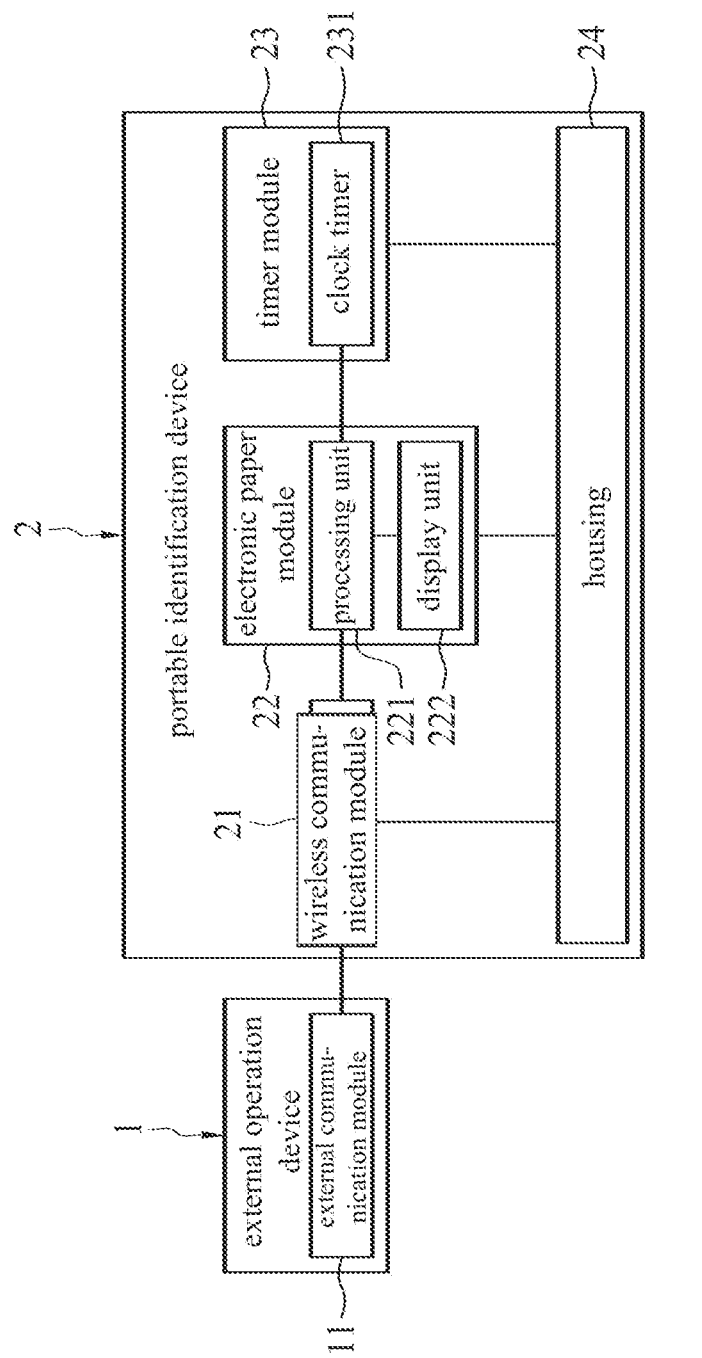
FIG. 1 is a block diagram of an identification system using electronic paper provided by an embodiment of the present disclosure.

The present disclosure is described in more detail through the following examples that are intended to be illustrative only, as numerous modifications and variations thereto will be apparent to those skilled in the art. Identical or similar numerals in the drawings indicate identical or similar components or steps throughout the views. As used in the description herein and throughout the claims that follow, unless the context clearly dictates otherwise, the meaning of "a", "an", and "the" includes plural reference, and the meaning of "in" includes "in" and "on". Titles or subtitles are used herein for the convenience of the reader, which shall not affect the scope of the present disclosure.

The terms used herein generally have their ordinary meanings in the art. In the case of conflict, the present document, including any definitions given herein, will prevail. The same item can be expressed in more than one way. Alternative language and synonyms can be utilized for any term(s) discussed herein, and no specific significance is to be given to whether a term is elaborated on or discussed herein. A recital of one or more synonyms does not exclude the use of other synonyms. The use of examples anywhere in this specification, including examples of any terms, is illustrative only, and in no way limits the scope and meaning of the present disclosure or of any exemplified term. Likewise, the present disclosure is not limited to the various embodiments provided herein. Cardinal numbering terms such as "first", "second" or "third" can be used to describe various components or the like, which are for distinguishing one component from another only, and are not intended to, nor should they be construed to impose any substantive limitations on the components or the like.

Reference is made to FIG. 1, wherein FIG. 1 is a block diagram of an identification system using electronic paper provided by an embodiment of the present disclosure. The identification system S includes an external operation device 1 and a portable identification device 2. The external operation device 1 includes an external communication module 11, and the portable identification device 2 includes a wireless communication module 21, an electronic paper module 22, a timer module 23 and a housing 24. The wireless communication module 21 is wirelessly coupled to the external communication module 11. Therefore, the external operation device 1 may communicate with the portable identification device 2 through the wireless communication module 21 of the portable identification device 2.

In the embodiments of the present disclosure, the external operation device 1 and the portable identification device 2 may be owned by different users or entities. For example, the external operation device 1 may be a personal computer, a notebook, a mobile device, an access control system, a ticket-checker, etc., and such devices or equipment may be owned by an event organizer, a merchant, a company, an organization, an employer, a transportation operator or a consumer, etc. Meanwhile, the portable identification device 2 may be a physical admission verification device provided to a consumer, an employee, a visitor, a passenger and the like by an event organizer, a company, an organization, an employer, a transportation operator or a merchant, etc. However, the specific implementations of the external operation device 1 and the portable identification device 2 are not limited thereto as long as they may achieve the objectives of the present disclosure.

The external communication module 11 of the external operation device 1 may be used to provide at least an external display information, and the external display information may be transmitted to the portable identification device 2 through the external communication module 11. Specifically, the wireless communication module 21 of the portable identification device 2 may receive the external display information from the external communication module 11. In the embodiments of the present disclosure, the wireless communication module 21 may include at least one of a passive radio frequency identification (RFID) unit, a near field communication (NFC) unit or a Bluetooth unit. In other words, the portable identification device 2 may perform data receiving and transmitting through an RFID, NFC or Bluetooth data transmission technique. Therefore, in order to communicate with the portable identification device 2, the external communication module 11 of the external operation device 1 may have a transceiver component corresponding to the wireless communication module 21 of the portable identification device 2.

For example, in an embodiment of the present disclosure, when the wireless communication module 21 includes a passive RFID unit, the external communication module 11 includes an RFID reader. In another embodiment of the present disclosure, when the wireless communication module 21 includes an NFC unit or a Bluetooth unit, the external operation device 1 is, for example, a mobile device with NFC functionality or Bluetooth functionality, respectively.

Referring again to FIG. 1, the electronic paper module 22 is electrically coupled to the wireless communication module 21 and includes a processing unit 221 and a display unit 222 electrically coupled to the processing unit 221. When the wireless communication module 21 of the portable identification device 2 receives the external display information from the external communication module 11, the processing unit 221 may receive the external display information from the wireless communication module 21 and drive the display unit 222 according to the external display information for allowing the display unit 222 to display an image corresponding to the external display information.

Figure 2:
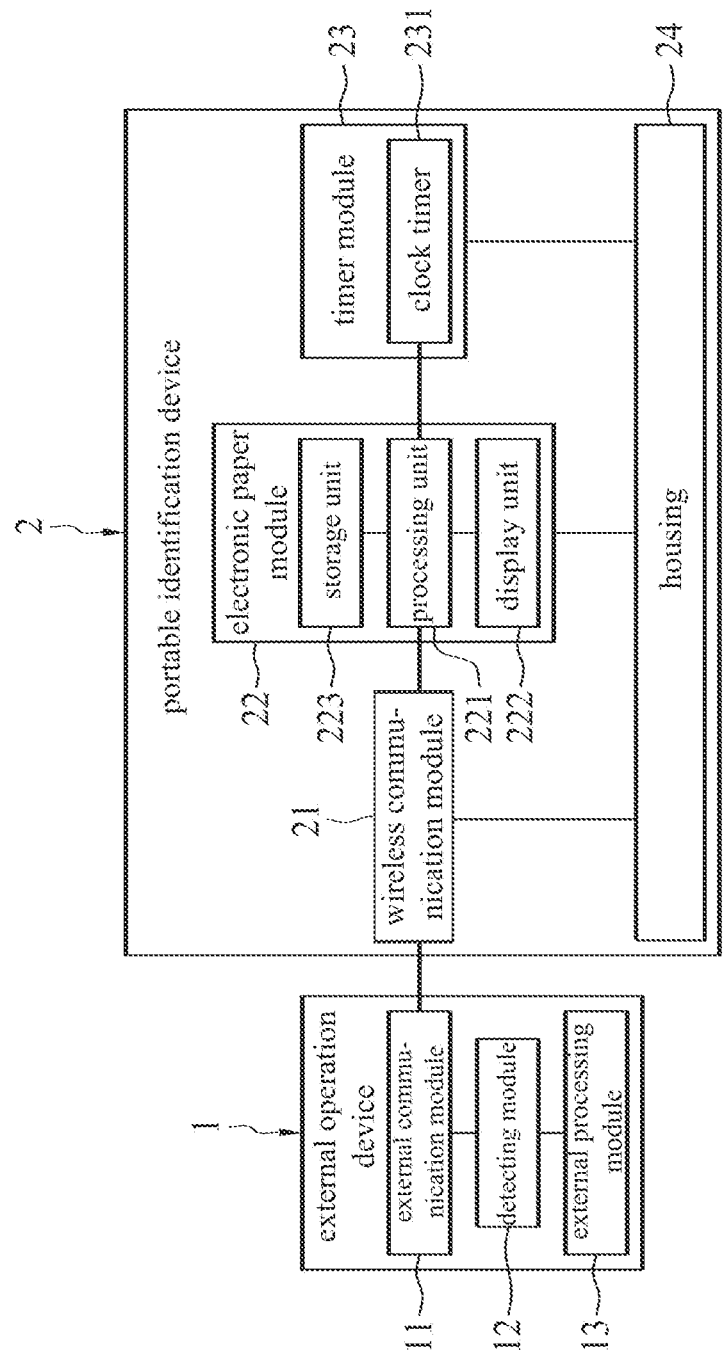
FIG. 2 is a block diagram of an identification system using electronic paper provided by another embodiment of the present disclosure.

Reference is now made to FIG. 2, wherein FIG. 2 is a block diagram of an identification device using electronic paper provided by another embodiment of the present disclosure. In an embodiment of the present disclosure, the electronic paper module 22 of the portable identification device 2 further includes a storage unit 223. In the present embodiment, the external display information received by the wireless communication module 21 may be processed by the processing unit 221 and the display unit 222 may be driven to display the corresponding image immediately. Alternatively, the processing unit 221 may store the external display information in the storage unit 223 and, after a predetermined period of time or under a predetermined timing, the external display information may be processed by the processing unit 221, and the display unit 222 may be driven to display the corresponding image. In other words, according to actual needs, the storage unit 223 may be used to temporarily store or pre-store the external display information received by the external operation device 1 and/or other information or data.

Figure 3:
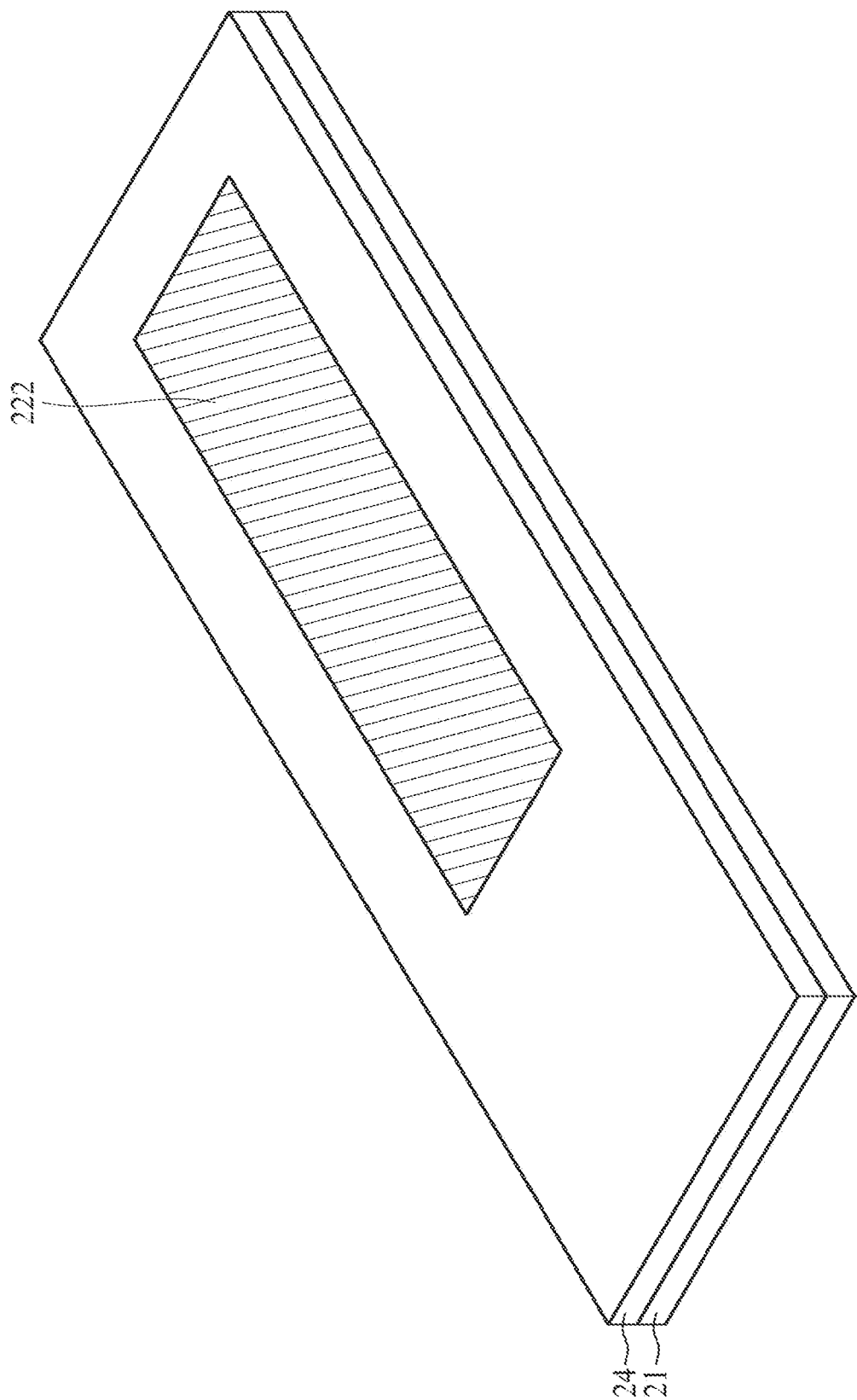
FIG. 3 is a perspective view of a portable identification device provided by an embodiment of the present disclosure.

Reference is now made to FIG. 3, wherein FIG. 3 is a perspective view of a portable identification device 2 provided by an embodiment of the present disclosure. When viewing the portable identification device 2, the image displayed by the display unit 222 may be observed. In the embodiments of the present disclosure, the image includes at least identification information and subsidiary information. The image may be black-and-white or colored, and is displayed based on the features of the electronic paper (also referred to as ePaper). Specifically, in the embodiments of the present invention, the identification information is information that is sufficient for identifying the user, such as a photo of the user (ID photo, mug shot or full-body picture, etc.), and/or an identification message exclusive to the user (such as an identification code known by the user only or a predetermined code, password or a character string, etc.). The identification message is preferably presented in the form of an encrypted barcode. In addition, the subsidiary information is information other than the identification information. For example, the subsidiary information may include at least one of the following data, including but not limited to time, place, notice, promotional image, redemption information of an event, and transportation information including but not limited to flight/train/bus/ferry number, departure/arrival time, destination, seat number, etc.

Reference is now made to FIG. 1 and FIG. 2. The portable identification device 2 further includes a timer module 23. The timer module 23 includes a clock timer 231 electrically coupled to the processing unit 221. The clock timer 231 may be used to enable the processing unit 221 to drive the display unit 222 at a predetermined time, thereby displaying the image on the display unit 222. As mentioned above, after the external display information for triggering the display unit 222 to display the image is transmitted to the electronic paper module 22, the processing unit 221 may first store the external display information in the storage unit 223, and then be processed by the processing unit 221 to drive the display unit 222 to display the corresponding image after a predetermined period of time or at a predetermined time. The clock timer 231 is used to send a command to the processing unit 221 after the predetermined period of time or at the predetermined time according to preset procedures for enabling the processing unit 221 to drive the display unit 222 for displaying the image. For example, if an event is scheduled to be hosted on Christmas Day (December 25), the clock timer 231 may send a command to the processing unit 221 at a predetermined time (for example, 7 PM) on Christmas Eve Day (December 24) to drive the display unit 222 to display an image which includes a notice to remind the user of an event that is going to be held on Christmas Day.

Reference is now made to FIG. 1 to FIG. 3. As shown in FIG. 3, the portable identification device 2 further includes a housing 24, and the electronic paper module 22 and the timer module 23 are disposed on or within the housing 24 in a manner such that the image displayed on the display unit 222 is visible from outside of the housing 24. In the embodiments of the present disclosure, the material and the structure of the housing 24 is not limited as long as the image displayed on the display unit 222 may be observed from outside of the housing 24. For example, the housing 24 may be made of paper, plastic, metal, glass, ceramic, etc. In a preferred embodiment of the present disclosure, the housing 24 is printed cardboard. In another embodiment, a portion of the housing 24 may be made of transparent plastic material, and hence, the image displayed by the display unit 222 may be visible through the housing 24. In yet another embodiment, the housing 24 is formed of printed cardboard and an opening is formed in the housing 24, thereby allowing the image displayed by the display unit 222 to be visible through the opening.

Similar to the electronic paper module 22 and the timer module 23, the wireless communication module 21 may also be disposed in the housing 24. Alternatively, the wireless communication module 21 may be fixed on the housing 24, as shown by FIG. 3. For example, the wireless communication module 21 may be affixed to the side of the housing 24 opposite the display unit 222 by an adhesive or the like.

The details of the external display information are now provided. The external display information may include the information intended to be displayed on the portable identification device 2, and is thus consistent with the image. In other words, the external display information may be presented to the user by displaying the image on the display unit 222. The user may be the holder of the portable identification device 2, and/or the event organizer, company, organization, transportation operator, employer or other personnel who sends or distributes the portable identification device 2 to the holder.

For example, the external display information may include the picture and information of the holder of the portable identification device 2. When the portable identification device 2 is used as an admission pass (a ticket) for an event, the external display information may further include information regarding the time, place and relevant details of the event. When the portable identification device 2 is used as a pass or a permit to access property or an area, the external display information may further include information regarding the applicable time span, the scope of the area and other relevant details of the granted access. When the portable identification device 2 is used as a ticket for transportation purposes, the external display information may further include the departure time, the arrival time, the seat number and the regulations related to the flight, train, cruise or ferry, etc. However, the detailed content of the external display information is not limited by the present disclosure.

Reference is made again to FIG. 2. In some embodiments of the present disclosure, the external operation device 1 may further include a detecting module 12 and an external processing module 13. The detecting module 12 may be used to detect the status of use of the external operation device 1 based on the image displayed on the display unit 222, and the external processing module 13 may be used to generate the external display information according to the status of use. The detecting module 12 may be used to read the encrypted barcode displayed on the display unit 222, and the external processing module 13 may be used to decrypt the encrypted barcode.

Further, in an embodiment, the external operation device 1 may be connected to a database, and the external processing module 13 may compare the identification information with file data stored in the database for generating the external display information. In other words, in addition to allowing identification and verification to be performed manually using the image displayed on the display unit 222, the identification and verification may be performed automatically by the external operation device 1 by accessing a database according to the information presented in the image.

Alternatively, in an embodiment, the external operation device 1 may obtain the identification information of the user (such as a consumer) by detecting the image displayed on the display unit 222 through the detecting module 12, and the external processing module 13 may compare the identification information with the information stored in the database in advance. Subsequently, another user (such as the personnel of the event organizer) may manually determine if the user (holder) of the portable identification device 2 meets the criteria of the identification information shown in the image on the display unit 222. The details of the method for operating the identification system S is described with the reference to the following specific exemplified examples.

Figure 4:
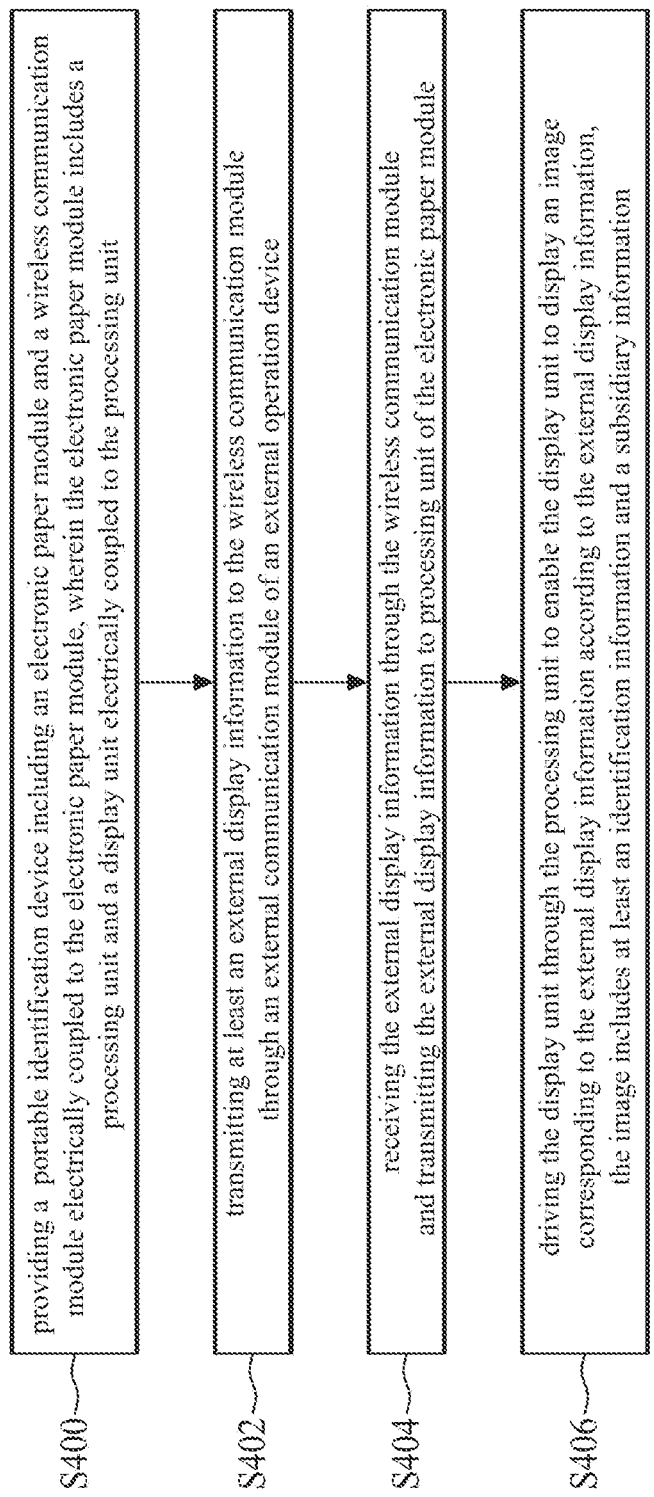
FIG. 4 is a flow chart of a method for operating an identification system using electronic paper provided by an embodiment of the present disclosure.
Figure 5:
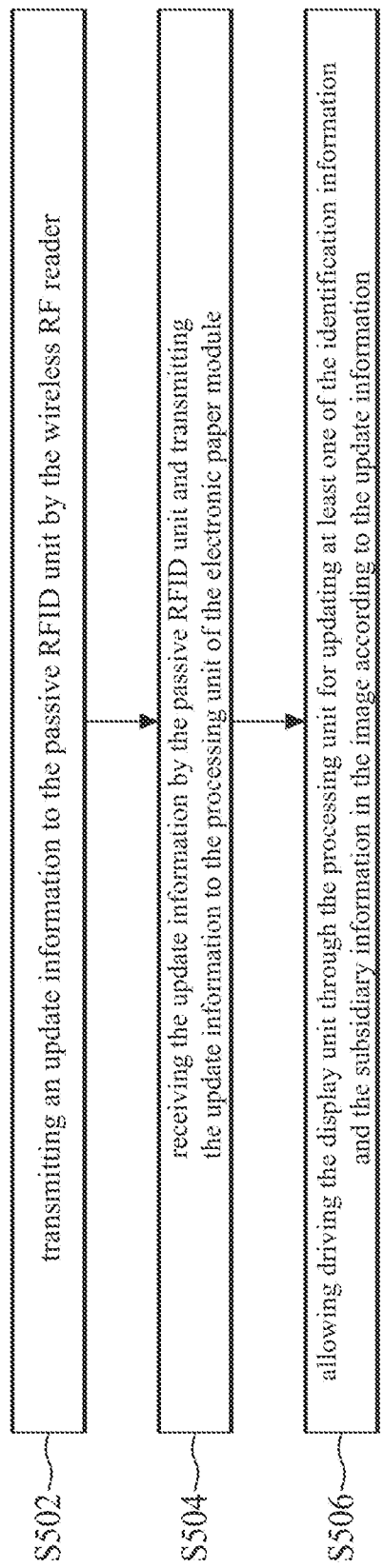
FIG. 5 is a flow chart of a method for operating an identification system using electronic paper provided by another embodiment of the present disclosure.
Figure 6:
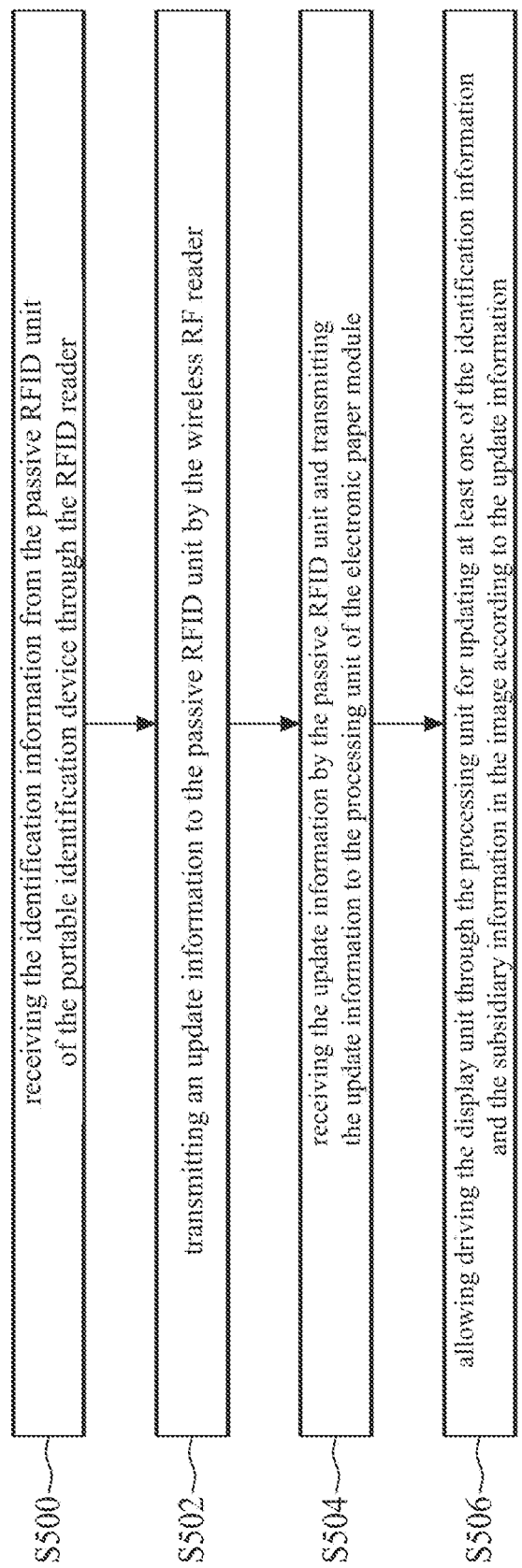
FIG. 6 is a flow chart of a method for operating an identification system using electronic paper provided by yet another embodiment of the present disclosure.

Reference is now made to FIG. 4 to FIG. 6, wherein FIG. 4 to FIG. 6 are flowcharts for operating the identification system using electronic paper provided by the embodiments of the present disclosure. As shown in FIG. 4, the method for operating an identification system using electronic paper includes: providing a portable identification device 2 including an electronic paper module 22 and a wireless communication module 21 electrically coupled to the electronic paper module 22, wherein the electronic paper module 22 includes a processing unit 221 and a display unit 222 electrically coupled to the processing unit 221 (step S400); transmitting at least external display information to the wireless communication module 21 through an external communication module 11 of an external operation device 1 (step S402); receiving the external display information through the wireless communication module 21 and transmitting the external display information to the processing unit 221 of the electronic paper module 22 (step S404); and driving the display unit 222 through the processing unit 221 to enable the display unit 222 according to the external display information to display an image corresponding to the external display information, wherein the image includes at least identification information and subsidiary information (step S406).

Specifically, the method is operated through the identification system S mentioned above. Therefore, the details related to the components of the identification system S are not reiterated herein. At first, in step S400, the portable identification device 2 is provided. Next, in step S402, the external display information is transmitted to the wireless communication module 21 of the portable identification device 2 through the external communication module 11 of the external operation device 1. The signal transmission procedure of step S402 will be described later with reference to specific embodiments.

Next, in step S404, the wireless communication module 21 receives the external display information and transmits the external display information to the processing unit 221. Lastly, in step S406, the processing unit 221 drives the display unit 222 according to the external display information to allow the display unit 222 to display an image corresponding to the external display information. It should be noted that step S406 does not necessarily need to be performed immediately after step S404. For example, after the wireless communication module 21 receives the external display information and transmits the external display information to the processing unit 221, the processing unit 221 may store the external display information in the storage unit 223 and only perform step S406 to display the image on the display unit 222 when there is a need to display the corresponding image.

Next, reference is made to FIG. 5. As shown in FIG. 5, the method for operating the identification system S provided by the embodiments of the present disclosure may further include the following steps: transmitting update information to the passive RFID unit by the wireless RF reader (step S502); receiving the update information by the passive RFID unit and transmitting the update information to the processing unit 221 of the electronic paper module 22 (step S504); and driving the display unit through the processing unit for the display unit to update at least one of the identification information and the subsidiary information in the image according to the update information (step S506).

Specifically, FIG. 5 is a flowchart showing the steps of an operating method according to an embodiment of the present disclosure. In the present embodiment, the wireless communication module 21 includes a passive RFID unit, and the external communication module 11 includes an RFID reader. In other words, in the embodiment shown in FIG. 5, the external display information is transmitted through the RFID data transmission technique. In addition, in the present embodiment, the external display information includes update information, and before step S502, the display unit 222 of the portable identification device 2 has shown an image generated according to an external display information. Specifically, the update information transmitted in step S502 is used to update the image already shown on the display unit 222.

In addition, as shown in FIG. 6, in an embodiment of the present disclosure, the method for operating the identification system using electronic paper may include the following steps before performing steps S502, S504 and S506: receiving the identification information from the passive RFID unit of the portable identification device 2 through the RFID reader (step S500). In other words, before transmitting the update information to the passive RFID unit through the RFID reader, the identification information provided by the portable identification device 2 may be read first in order to determine if the update information should be transmitted.

Specifically, when a user intends to update the image displayed on the display unit 222, he/she may check or confirm the information shown in the image on the display unit 222 by the external operation device 1, then transmit corresponding update information according to the confirmed information to the wireless communication module 21 of the portable identification device 2. For example, in this embodiment, the external operation device 1 may further include an external processing module 13, wherein, after reading the identification information in the image displayed on the display unit 222 by the external communication module 11 (for example, an RFID reader, etc.) of the external operation device 1, the external processing module 13 may conduct processing or operation according to the received identification information for generating the update information.

The details of the present disclosure will be further illustrated by the following specific embodiments.

First Specific Embodiment

In the first specific embodiment, the identification system S provided by the embodiments of the present disclosure is used for providing an admission pass to an event. For example, the event may be a concert, a performance, an exhibition, a seminar, or a conference, etc. First, the event organizer collects personal information from consumers or the participants through the registration process of the event. The personal information may include name, picture or other personal information that may be used to identify the participants. Next, the event organizer produces the personalized information for the admission pass according to the obtained personal information. The method for producing the personalized information is not to be limited in the embodiments of the present disclosure. For example, the personalized information may be produced by specific application on a personal computer or a mobile device. In addition, the personalized information may be presented in the form of an image file and/or a text file.

Next, the personalized information for the admission pass may be transmitted to the portable identification device 2 by the external operation device 1 as the external display information. In this specific embodiment, the external communication module 11 of the external operation device 1 may include an RFID reader (that also has transmission or writing ability), an NFC unit or a Bluetooth unit, and the external communication module 11 may transmit the external display information to the wireless communication module 21 of the portable identification device 2. In this case, the wireless communication module 21 possesses a communication function corresponding to the external communication module 11.

After the external display information is received by the wireless communication module 21, the wireless communication module 21 transmits the external display information to the processing unit 221, and the processing unit 221 drives the display unit 222 according to the external display information to allow the display unit 222 to display the image corresponding to the external display information, i.e., the personalized information for the admission pass. The image of the personalized information for the admission pass may include the personal information (the identification information) collected from the participant and the information of the event (the subsidiary information). Next, the portable identification device 2 may be transferred to the participant as the admission pass for the event from the event organizer.

It should be noted that because the display unit 222 in the embodiments of the present disclosure utilizes electronic paper to display the image, the image may be displayed on the display unit 222 permanently without supplying power to the portable identification device 2. Thereafter, when there is a need to alter the image displayed on the display unit 222, the event organizer or the participant may proceed to change the image according to actual needs. In this specific embodiment, during the preparation of the portable identification device 2 by the event organizer, the external display information transmitted to the wireless communication module 21 may include primary information and/or update information, wherein the primary information in the external display information is used to allow the processing unit 221 to drive the display unit 222 to display the image, while the update information in the external display information is stored in the storage unit 223 by the processing unit 221. Therefore, when the participant receives the portable identification device 2, the image displayed on the display unit 222 may be generated by the primary information in the external display information. Next, after a predetermined period of time or under a specific timing, the clock timer 231 of the timer module 23 in the portable identification device 2 may send a command to the processing unit 221 to prompt the processing unit 221 to drive the display unit 222 to update the displayed image under said timing.

Alternatively, in another scenario, after receiving the portable identification device 2, the participant may change the image through an application on a mobile device. For example, the participant may change the information other than the identification information in the image, such as adding the image of the poster of the event to the displayed image, thereby augmenting the user experience. On the day of the event, the participant may enter the event facility by carrying the portable identification device 2. In a usage scenario, the display unit 222 of the portable identification device 2 displays a picture of the participant, and event personnel are present at the entrances of the event facility to confirm that the appearance of the holder of the portable identification device 2 conforms with the picture displayed on the display unit 222. In another usage scenario, an external operation device 1 may be installed at the entrance of the event facility, and the external operation device 1 may receive identification information from the portable identification device 2. For example, the external communication module 11 of the external operation device 1 receives the identification information from the wireless communication module 21. Alternatively, the detecting module 12 of the external operation device 1 may receive the identification information according to the image. Thereafter, the received identification information may be verified by personnel of the event organizer manually, or verified by the external operation device 1 automatically.

After confirming that the identification information of the participant is consistent with the registration data, the external operation device 1 may transmit update information to the passive RFID unit of the wireless communication module 21 through the external communication module 11 (for example, an external communication module 11 including an RFID reader), and the update information may be further transmitted to the processing unit 221 to allow the display unit 222 to update the image according to the update information. For example, the updated image may display text or an image (such as an electric stamp) stating that the pass has been "used" or "redeemed."

Similarly, the portable identification device 2 may be used as a voucher to claim or redeem event-related merchandise. In such cases, similar to the process described above, the image displayed on the display unit 222 may be updated to include the text or an image stating "redeemed" according to the update information transmitted to the portable identification device 2. In this scenario, the detecting module 12 and the external processing module 13 of the external operation device 1 may be used to detect the usage state of the portable identification device 2, i.e., to determine whether the portable identification device 2 has already been used to enter the event facility or to claim or redeem merchandise.

Lastly, after the event, the portable identification device 2 may be recycled by the event organizer for reuse or may be kept by the participant, and the participant may change the image on the display unit 222 by an application on a mobile device. For example, the image may be changed to include a picture taken during the event, such that the portable identification device 2 may be a souvenir from the event.

Second Specific Embodiment

Figure 7:
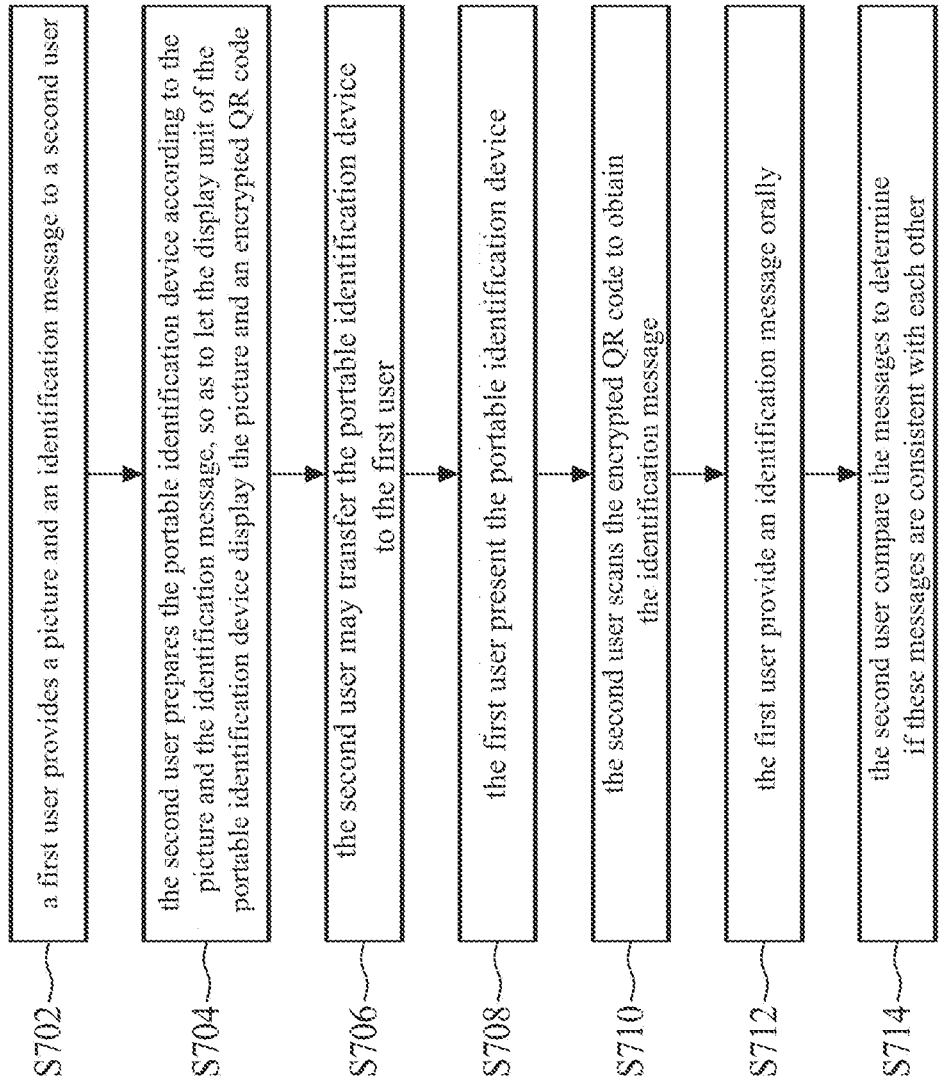
FIG. 7 is a flow chart of a method for operating an identification system using electronic paper provided by a further embodiment of the present disclosure.

Reference is now made to FIG. 7, wherein FIG. 7 is a flow chart of a method for operating an identification system using electronic paper S provided by yet another embodiment of the present disclosure. In the second specific embodiment, the identification system S provided by the embodiments of the present disclosure may be used to perform a double-verification identification procedure.

As shown in FIG. 7, in step S702, a first user provides a picture and an identification message to a second user. In this specific embodiment, the first user may be, for example, a consumer or a participant of an event, and the second user may be, for example, a personnel member of an event organizer. In step S702, the first user provides a picture, such as an ID photo, and an identification message, such as a password, to the second user. In the embodiments of the present disclosure, the password may be a text message selected by the first user, for example, a character string comprising the birth date of the first user, etc.

Thereafter, in step S704, the second user prepares the portable identification device 2 according to the picture and the identification message, so as to let the display unit 222 of the portable identification device 2 display the picture and an encrypted QR code. Specifically, the second user may transmit an image file of a admission pass to the portable identification device 2 by the external operation device 1 to cause the display unit 222 to display the image file (as the image). The image may include the picture and the encrypted QR code generated from the identification message. Therefore, from the display unit 222, only the picture and the encrypted QR code may be observed visually, while the identification message remains secret.

In step S706, the second user may transfer the portable identification device 2 to the first user. For example, the portable identification device 2 may be mailed/couriered to the participants or the participants may pick up the portable identification device 2 by themselves. Next, on the event date, the participant (the first user) may present the portable identification device 2 when arriving at the event facility (Step S708). Then the personnel member (as the second user) at the entrance of the event facility may confirm whether the participant is the person registered for the event by the picture displayed on the display unit 222 of the portable identification device 2. Thereafter, the second user scans the encrypted QR code to obtain the identification message (step S710). It should be noted that the encrypted QR code may only be decoded and obtained through the external operation device 1 used by the second user. Subsequently, the second user may require the first user to provide the identification message, and the first user may provide an identification message orally (step S712). Then the second user compares the message obtained from the encrypted QR code and the message provided by the first user orally to determine if these messages are consistent with each other (step S714). Specifically, according to the identification message obtained by scanning and decoding the encrypted QR code, the second user may determine if the identification message provided by the first user is correct, thereby verifying the identity of the first user once again.

In this specific embodiment, in addition to the picture (image) displayed on the portable identification device 2, the identity of the user is further verified by an identification message (text). Therefore, the method and system using such a double-verification identification procedure may significantly enhance the security of the identification process. In addition, if the picture displayed on the portable identification device 2 seemingly differs from the on-site appearance of the first user and the identification purpose thus cannot be achieved, the identification message may serve as a backup means of identification.

In addition, because the identification message (password) is presented in the form of an encrypted QR code on the display unit 222 of the portable identification device 2, and only the external operation device 1 which is able to decode the encrypted QR code may obtain the identification message from the QR code, therefore, only the participant (the first user) who selected the identification message would know the content of the identification message before entering the event facility, and hence, the identification purpose may be fulfilled.

In a scenario of this specific embodiment, the identification message may be changed from time to time when in need. For example, the user may change the identification message through a specific application, thereby changing the encrypted QR code displayed on the display unit 222 of the portable identification device 2. Therefore, the double verification procedure may significantly strengthen the security of the identification system S.

One of the major technical means of the present disclosure resides in that, based on the unique design of the wireless communication module 21, the electronic paper module 22 and the timer module 23 in the portable identification device 2 and the cooperation among the above modules and the external operation device 1, the portable identification device 2, an identification system S and the operation method thereof provided herein may be used to display specific information on the display unit 222 of the electronic paper module 22 and utilize such information for achieving the purpose of conveniently and efficiently performing individual identification in a very secure way.

Specifically, because the present disclosure utilizes the electronic paper module 22 which may retain an image permanently without power being supplied to the display unit, the cost of providing a power supply is eliminated. In addition, the image displayed on the display unit 222 may be changed when a small amount of electricity is provided to the portable identification device 2, and hence, the flexibility and convenience of the portable identification device 2 may be significantly increased.

Moreover, as mentioned above, the portable identification device 2, the identification system S and the operation method thereof according to the present disclosure may be used to perform security checks and verification procedures at different security grades. Specifically, in addition to determining the identity of a user through her/his picture, an identification message obtained by the portable identification device 2 may be used in combination with a specifically engineered process for increasing the accuracy of the identification procedure.

The above embodiments were chosen and described in order to explain the principles of the disclosure and their practical application, so as to enable others skilled in the art to utilize the disclosure in various embodiments and with various modifications as are suited to the particular use contemplated. Alternative embodiments will be apparent to those skilled in the art to which the present disclosure pertains without departing from its spirit and scope.

What is claimed is:

1. An identification system using electronic paper including:
   an external operation device including an external communication module for providing at least external display information; and
   a portable identification device including:
     a wireless communication module electrically coupled to the external communication module for receiving the external display information from the external communication module;
     an electronic paper module electrically coupled to the wireless communication module and including a processing unit and a display unit electrically coupled to the processing unit, wherein the processing unit is configured to receive the external display information from the wireless communication module and drive the display unit according to the external display information to allow the display unit to display an image corresponding to the external display information, wherein the image includes at least identification information of a user and subsidiary information;
     a timer module including a clock timer electrically coupled to the processing unit, the clock timer being configured to allow the processing unit to drive the display unit at a predetermined time to display the image on the display unit; and
     a housing, wherein the wireless communication module, the electronic module and the timer module are disposed in the housing in such a manner that the image displayed on the display unit is visible from the housing;
   wherein the identification information comprises at least a picture of the user;
   wherein the external operation device further includes an external processing module connected to a database, wherein the external processing module is configured to compare the identification information of the user with a file information stored in the database for generating the external display information.

2. The identification system according to claim 1, wherein the wireless communication module includes at least one of a passive radio frequency identification (RFID) unit, a near-field communication (NFC) unit and a Bluetooth unit.

3. The identification system according to claim 2, wherein, when the wireless communication module includes the passive RFID unit, the external communication module includes an RFID reader and the external operation device is connected to a database, wherein the RFID reader is configured to provide the external display information stored in the database to the wireless communication module, and to read the identification information from the portable identification device.

4. The identification system according to claim 2, wherein, when the wireless communication module includes the NFC unit or the Bluetooth unit, the external operation device is a mobile device with NFC or Bluetooth communication functionality, respectively.

5. The identification system according to claim 4, wherein the external display information comprises update information, and the mobile device is configured to transmit the update information to the portable identification device by the NFC or Bluetooth communication functionality, thereby altering at least one of the identification information and the subsidiary information.

6. The identification system according to claim 1, wherein the identification information of the user further comprises an identification message presented as an encrypted barcode.

7. The identification system according to claim 1, wherein the external operation device further includes a detecting module and an external processing module, wherein the detecting module is configured to detect the usage status of the portable identification device according to the image corresponding to the external display information, and the external processing module is configured to generate the external display information according to the usage status.

8. The identification system according to claim 1, wherein the electronic paper module further includes a storage unit for storing the received external display information.

9. The identification system according to claim 1, wherein the electronic paper module further includes a storage unit for storing the external display information in advance, and the clock timer of the timer module is configured to allow the processing unit to drive the display unit according to the external display information stored in the storage unit at the predetermined time for displaying the image on the display unit.

10. A method for operating an identification system using electronic paper, including:
providing a portable identification device including an electronic paper module and a wireless communication module electrically coupled to the electronic paper module, wherein the electronic paper module includes a processing unit and a display unit electrically connected to the processing unit;
transmitting at least external display information to the wireless communication module through an external communication module of an external operation device;
receiving the external display information through the wireless communication module and transmitting the external display information to the processing unit of the electronic paper module; and
driving the display unit through the processing unit to allow the display unit to display an image corresponding to the external display information according to the external display information, wherein the image includes at least identification information of a user and subsidiary information, wherein the identification information comprises at least a picture of the user; and
comparing, with an external processing module connected to a database and included in the external operation device, the identification information with a file information stored in the database for updating the external display information.

11. The method according to claim 10, wherein the wireless communication module includes at least one of a passive RFID unit, an NFC unit and a Bluetooth unit.

12. The method according to claim 11, wherein the wireless communication module includes the passive RFID unit, the external communication module includes an RFID reader, and the method further includes:
transmitting update information through the RFID reader to the passive RFID unit;
receiving the update information through the passive RFID unit and transmitting the update information to the processing unit of the electronic paper module; and
driving the display unit through the processing unit for updating at least one of the identification information and the subsidiary information in the image according to the update information.

13. The method according to claim 12, further including:
before the step of transmitting update information through the RFID reader to the passive RFID unit, receiving the identification information from the passive RFID unit of the portable identification device through the RFID reader.

14. The method according to claim 13, wherein the external operation device further includes an external processing module, and the update information is generated by the external processing module according to the received identification information.

15. A portable identification device, including:
a wireless communication module electrically coupled to an external communication module included in an external operation device, wherein the external communication module is configured to provide at least external display information, and the wireless communication module is configured to receive the external display information from the external communication module;
an electronic paper module electrically coupled to the wireless communication module, the electronic paper module including a processing unit and a display unit electrically coupled to the processing unit, wherein the processing unit is configured to receive the external display information from the wireless communication module and to drive the display unit according to the external display information to allow the display unit to display an image corresponding to the external display information, wherein the image includes at least identification information of a user and subsidiary information, wherein the identification information comprises at least a picture of the user;
a timer module including a clock timer electrically coupled to the processing unit, the clock timer being configured to allow the processing unit to drive the display unit at a predetermined time for displaying the image on the display unit; and
a housing, wherein the wireless communication module, the electronic paper module and the timer module are disposed in the housing in such a manner that the image displayed on the display unit is visible from the housing;

wherein the external operation device further includes an external processing module connected to a database, wherein the external processing module is configured to compare the identification information of the user with a file information stored in the database for generating the external display information.

* * * * *